Patented Aug. 14, 1923.

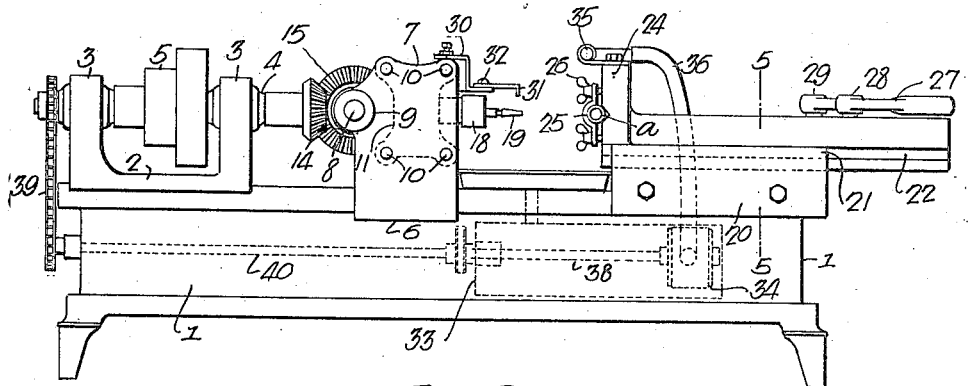

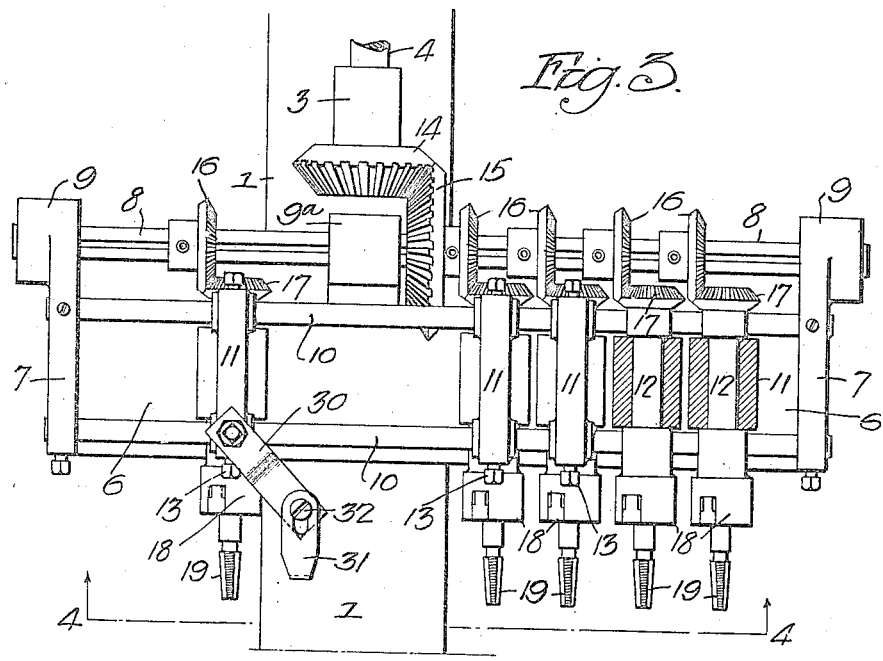
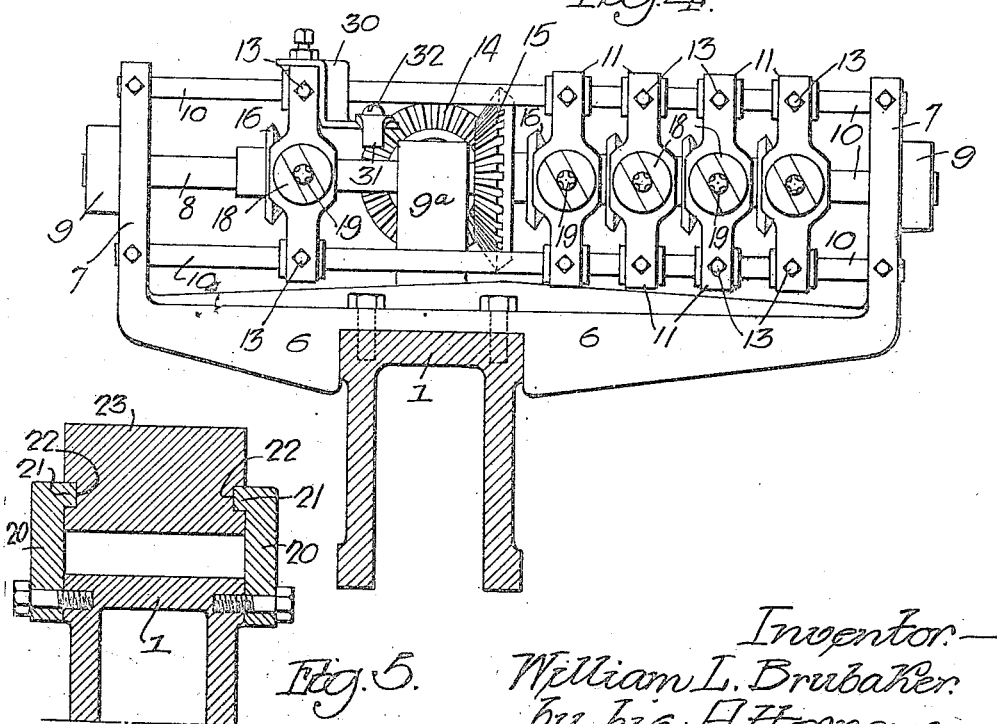
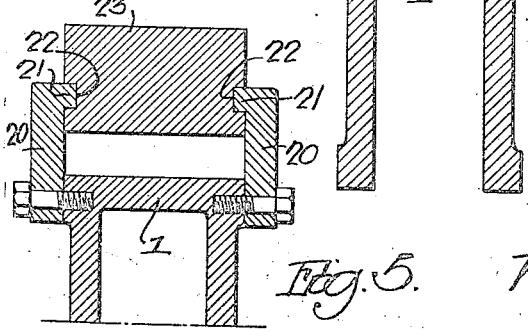

1,465,112

UNITED STATES PATENT OFFICE.

WILLIAM L. BRUBAKER, OF ENOLA, PENNSYLVANIA.

MULTIPLE TAPPING MACHINE.

Application filed May 11, 1922. Serial No. 560,033.

*To all whom it may concern:*

Be it known that I, WILLIAM L. BRUBAKER, a citizen of the United States, residing in Enola, Cumberland County, Pennsylvania, have invented certain Improvements in a Multiple Tapping Machine, of which the following is a specification.

One object of my invention is to construct a machine for simultaneously tapping a number of holes in pipes, or other articles.

A further object of the invention is to make the spindle bearings adjustable.

These objects I attain in the following manner, reference being had to the accompanying drawings, in which:

Fig. 1 is a side view of my improved tapping machine;

Fig. 2 is a plan view of the machine;

Fig. 3 is an enlarged plan view, partly in section;

Figure 4 is a transverse sectional view on the line 4—4, Fig. 3;

Fig. 5 is a transverse sectional view on the line 5—5, Fig. 1;

Fig. 6 is a detached perspective view of one of the bearings; and

Fig. 7 is a sectional view of the lubricating pipe.

1 is the base of the machine on which is mounted a head 2 having bearings 3 for a driven shaft 4. On this shaft is a three faced pulley 5 for the driving belt. Secured to the bed, in front of the head 2, is a transverse frame 6 having upright ends 7. A shaft 8 is mounted in bearings 9 formed integral with the ends 7, and an intermediate bearing 9ª is preferably used, which forms an integral part of the frame. Extending from one end of the frame to the other end are four rods 10 on which are mounted the spindle bearings 11. Each spindle bearing is made as shown in Fig. 6, and has a central opening through which the spindle 12 extends. The spindle bearings can be adjusted on the rods and held in the position in which they are adjusted by set screws 13.

On the inner end of the shaft 4 is a bevel pinion 14, which meshes with a bevel wheel 15 secured to the shaft 8. Adjustably mounted on the shaft 8 are bevel gear wheels 16, which mesh with gear wheels 17 on the spindles 12. At the opposite end of each spindle from the gear wheel is a chuck 18 of any of the ordinary types. Each chuck has clamping jaws for a tap 19.

Secured to the opposite end of the base 1 from the head 2 are two plates 20. Each plate has a rib 21 extending into a groove 22 in a slide 23. On the inner end of the slide is an elongated support 24 for the work to be tapped. In the present instance, the support has a longitudinal V-groove for a pipe *a* to be tapped. The pipe is secured to the support by clamp plates 25 and wing nuts 26 on bolts projecting from the support. The slide can be moved towards and from the spindle-carrying frame by a lever 27, pivoted at 28 to the slide, and extending through a swivel bearing 29 on one of the plates 20.

Adjustably mounted on one of the spindle bearings 11 is an arm 30 to which is attached a stop 31. The stop is slotted for the passage of a clamp screw 32. The stop limits the movement of the slide 23, and the extent to which the work is penetrated by the tap.

In order to provide a continuous flow of lubricating liquid over the work and the tools, a reservoir 33 is provided. The reservoir is secured to the side of the base, in the present instance, and a circulating pump 34 is connected to the reservoir and to an overhead pipe 35 by a flexible tube 36. The pipe 35 is perforated, as shown in Fig. 7, to allow the liquid to flow onto the work. 37 is a pan, which collects the lubricating liquid and returns it to the reservoir.

The pump shaft 38 is driven from the shaft 4 through a belt 39 and shaft 40. Other means of driving the pump may be used, if desired.

The work *a*, in the present instance, is the manifold pipe of a gas range. The pipe has been drilled at a number of points and the holes are to be tapped for the gas cocks and branches leading to the burners of the range. The spindle bearings are properly adjusted on the bars and the taps are secured in the chucks. The pipe to be tapped is clamped to the support. The slide is then moved forward by the operating handle. As the taps enter the holes in the work, they cut a screw thread to the proper depth, after which the spindles are reversed by any ordinary reverse shifting mechanism, not shown. The tapped pipe is then removed and another pipe is secured in position.

While the invention is described as a tapping machine, it may be used as a drilling machine by substituting drill bits for the taps.

I claim:

1. The combination of a base; a head mounted on the base; a driven shaft on the head; a transverse frame mounted on the base; rods on the frame; a series of spindle bearings adjustably mounted on the rods; a spindle in each bearing; a longitudinal shaft having its bearings in the frame; gearing through which the said shaft is driven from the shaft on the head; a series of gear wheels adjustably mounted on the longitudinal shaft; gear wheels on the spindles meshing with the adjustable gear wheels, each spindle having a chuck for a tool; a slide on the base; a work carrier on the slide; and means for moving the work carrier towards and from the spindles.

2. The combination of a base; a head mounted on one end of the base; a shaft in said head; a gear wheel on the shaft; a transverse frame secured to the base; a longitudinal, splined shaft on the frame; a gear wheel thereon meshing with the first mentioned gear wheel; rods on the frame; a series of spindle bearings adjustably mounted on the rods; a spindle in each bearing; a gear wheel on one end of each spindle and a chuck at the opposite end of each spindle; a series of gear wheels on the splined shaft meshing with the gear wheels on the spindles; a work-carrying slide on the base; and means for moving said slide towards and from the chucks of the spindles.

WILLIAM L. BRUBAKER.